US011040524B2

(12) United States Patent
Lohre et al.

(10) Patent No.: US 11,040,524 B2
(45) Date of Patent: Jun. 22, 2021

(54) BIAXIALLY ORIENTED, UV-STABILIZED, SINGLE- OR MULTILAYER POLYESTER FILM WITH A COMBINATION OF SILICON DIOXIDE PARTICLES AS LIGHT-SCATTERING PARTICLES AND UV STABILIZER, PROCESS FOR PRODUCING SAME AND USE THEREOF IN GREENHOUSE BLINDS

(71) Applicant: Mitsubishi Polyester Film GmbH, Weisbaden (DE)

(72) Inventors: Claudia Lohre, Wiesbaden (DE); Holger Kliesch, Ginsheim (DE); Andreas Bork, Wiesbaden (DE); Yavuz Ünker, Nieder-Olm (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 15/404,866

(22) Filed: Jan. 12, 2017

(65) Prior Publication Data
US 2017/0208752 A1 Jul. 27, 2017

(30) Foreign Application Priority Data
Jan. 22, 2016 (DE) .......................... 102016200875.7

(51) Int. Cl.
| | | |
|---|---|---|
| B32B 27/36 | (2006.01) | |
| B29C 48/08 | (2019.01) | |
| B29C 48/00 | (2019.01) | |
| B29C 48/21 | (2019.01) | |
| B29C 48/88 | (2019.01) | |
| B32B 27/18 | (2006.01) | |
| B32B 27/08 | (2006.01) | |
| B32B 27/20 | (2006.01) | |
| B32B 7/02 | (2019.01) | |
| A01G 9/14 | (2006.01) | |
| A01G 9/22 | (2006.01) | |
| A01G 9/24 | (2006.01) | |
| B29C 55/12 | (2006.01) | |
| G02B 5/02 | (2006.01) | |
| B29K 67/00 | (2006.01) | |
| B29K 105/00 | (2006.01) | |

(Continued)

(52) U.S. Cl.
CPC .......... *B32B 27/36* (2013.01); *A01G 9/1407* (2013.01); *A01G 9/22* (2013.01); *A01G 9/24* (2013.01); *B29C 48/0018* (2019.02); *B29C 48/022* (2019.02); *B29C 48/08* (2019.02); *B29C 48/21* (2019.02); *B29C 48/914* (2019.02); *B29C 55/12* (2013.01); *B32B 7/02* (2013.01); *B32B 27/08* (2013.01); *B32B 27/18* (2013.01); *B32B 27/20* (2013.01); *G02B 5/0242* (2013.01); *G02B 5/0278* (2013.01); *A01G 2009/1484* (2013.01); *B29K 2067/003* (2013.01); *B29K 2105/0044* (2013.01); *B29K 2105/16* (2013.01); *B29K 2509/02* (2013.01); *B29K 2995/0026* (2013.01); *B29K 2995/0053* (2013.01); *B29L 2007/008* (2013.01); *B29L 2009/00* (2013.01); *B29L 2031/7006* (2013.01); *B32B 2250/244* (2013.01); *B32B 2264/102* (2013.01); *B32B 2307/408* (2013.01); *B32B 2307/412* (2013.01); *B32B 2307/71* (2013.01); *B32B 2410/00* (2013.01); *Y02A 40/25* (2018.01)

(58) Field of Classification Search
CPC .......... B32B 27/00–27/42; G02B 5/02; G02B 5/0236; G02B 5/0242
See application file for complete search history.

(56) References Cited

U.S. PATENT DOCUMENTS 5,783,307 A * 7/1998 Fagerburg .............. B32B 27/18
428/412
6,218,450 B1 * 4/2001 Fagerburg ................ C08K 5/34
524/86

(Continued)

FOREIGN PATENT DOCUMENTS

| | | |
|---|---|---|
| DE | 23 46 787 A1 | 3/1975 |
| DE | 69731750 T2 | 2/2006 |

(Continued)

OTHER PUBLICATIONS

Hanson, K.J. "The Radiative Effectiveness of Plastic Films for Greenhouses". Journal of Applied Meteorology and Climatology, vol. 2, No. 6, (1963); pp. 793-797.*

(Continued)

*Primary Examiner* — Prashant J Khatri
(74) *Attorney, Agent, or Firm* — ProPat, LLC; Cathy R. Moore

(57) ABSTRACT

The invention relates to biaxially oriented, UV-stabilized polyester films incorporating silicon dioxide particles as light-scattering particles and a UV stabilizer; a process for producing the same and to use thereof in greenhouse blinds. The invention particularly relates to single- or multilayer polyester film with transparency from 70 to 92 %, where:
the film includes at least 1.0% by weight to at most 2.5% by weight of $SiO_2$, with the $d_{50}$ value of these $SiO_2$ particles ranging from 3 to 9 μm,
the SV value of the film is at least 700,
the scattering factor SF of the film is at least 2 and not more than 8,
the haze of the film is from 60 to 95%, and
the clarity of the film is from 15 to 40%; and
all of the external layers comprise at least 0.3 % by weight of an organic UV stabilizer.

24 Claims, No Drawings

(51) Int. Cl.
*B29K 105/16* (2006.01)
*B29K 509/02* (2006.01)
*B29L 7/00* (2006.01)
*B29L 9/00* (2006.01)
*B29L 31/00* (2006.01)

(56) References Cited

U.S. PATENT DOCUMENTS

| | | | |
|---|---|---|---|
| 6,270,888 B1* | 8/2001 | Rutter | B32B 27/18 |
| | | | 428/212 |
| 6,613,819 B2* | 9/2003 | Johnson | B32B 27/18 |
| | | | 428/480 |
| 7,094,465 B2* | 8/2006 | Peiffer | B32B 27/20 |
| | | | 264/173.17 |
| 2002/0068159 A1* | 6/2002 | Peiffer | B29C 55/143 |
| | | | 428/220 |
| 2006/0270773 A1* | 11/2006 | Hale | C08K 5/0041 |
| | | | 524/423 |
| 2009/0297860 A1* | 12/2009 | Sasaki | B32B 27/36 |
| | | | 428/423.7 |
| 2010/0068493 A1* | 3/2010 | Jesberger | B29C 47/0021 |
| | | | 428/220 |

FOREIGN PATENT DOCUMENTS

| | | |
|---|---|---|
| DE | 10 2005 058 918 A1 | 6/2007 |
| DE | 10 2010 007 139 A1 | 8/2011 |
| DE | 10 2010 007 140 A1 | 8/2011 |
| DE | 10 2011 009 817 A1 | 9/2011 |
| EP | 0 144 948 A2 | 6/1985 |
| EP | 0 769 540 A2 | 4/1997 |
| EP | 1 614 536 A2 | 1/2006 |
| EP | 1 614 707 A1 | 1/2006 |

OTHER PUBLICATIONS

Karayannidis et al. "Thermal Behavior and Tensile Properties of Poly(ethylene terephthalate-co-ethylene isophthalate)". Journal of Applied Polymer Science, vol. 78, (2000); pp. 200-207.*

* cited by examiner

BIAXIALLY ORIENTED, UV-STABILIZED, SINGLE- OR MULTILAYER POLYESTER FILM WITH A COMBINATION OF SILICON DIOXIDE PARTICLES AS LIGHT-SCATTERING PARTICLES AND UV STABILIZER, PROCESS FOR PRODUCING SAME AND USE THEREOF IN GREENHOUSE BLINDS

CROSS-REFERENCE TO RELATED APPLICATIONS

This application claims priority to German Patent Application No. 10 2016 200 875.7 filed Jan. 22, 2016, which is hereby incorporated herein by reference in its entirety.

FIELD OF THE INVENTION

The present invention relates to a highly light-scattering, biaxially oriented, UV-stable polyester film having high transparency and at least one base layer which comprises silicon dioxide particles and a UV stabilizer. The film of the invention is suitable for producing greenhouse blinds. The film exhibits special transparency properties and high scattering. The invention further relates to a process for the production of the polyester film and also to its use in greenhouses.

BACKGROUND OF THE INVENTION

Films for blinds in greenhouses are required to fulfil a series of requirements. One is that the component of light that is needed for plant growth shall pass through the film/blind, and the component that is not required, and would lead to excessive heating of the greenhouse, shall be reflected. In the night, the blind, moreover, is to keep the heat ascending from the ground in the greenhouse, both by convection braking and also, again, by reflection.

It is also an advantage if the transmitted light reaches the plant as diffusely as possible, since this not only reduces the orientation of the plant to the light source but also permits lower parts of the plant as well to be lit more effectively. This requires a minimum scattering angle since if the scattering angles are too small, by far the greatest portion of the light will still always impinge directly from the direction of the light source. Nor, however, can the scattering angle be too large, since in that case it is not possible to reach lower-lying parts of the plant, owing to shading by neighbouring plants; moreover, particularly in the case of relatively small greenhouses, too much light will be scattered out of the greenhouse. The film ought moreover to have transparency (ASTM D-1003) from 70 to 92 in order to offer a good balance between sun protection and optimum supply of light. The film, moreover, must have UV stability allowing the blind to be used in a greenhouse for not less than 5 years without significantly yellowing or exhibiting embrittlement or cracking at the surface or suffering serious detriment to its mechanical properties.

Given that fires in greenhouses are a source of extensive economic damage, the film must exhibit reduced flammability.

SUMMARY OF ADVANTAGEOUS EMBODIMENTS OF THE INVENTION

The object of the present invention is to produce a biaxially oriented polyester film which features high transparency from 70 to 92%, also exhibits reduced flammability, and is distinguished in particular by a scattering activity suitable for greenhouse applications. Moreover, in a number of years of external use, the film ought not to undergo significant yellowing, ought not to exhibit embrittlement or cracking of the surface, and ought also not to suffer any application-critical deterioration in the mechanical properties. In the thickness range from 13 to 25 µm, furthermore, the film is also to be able to be produced economically on existing single- or multilayer polyester film lines.

DETAILED DESCRIPTION OF ADVANTAGEOUS EMBODIMENTS OF THE INVENTION

This object is achieved by a single- or multilayer polyester film with transparency from 70 to 92%, where:
the film comprises at least 1.0% by weight of $SiO_2$ and at most 2.5% by weight of $SiO_2$,
wherein the $d_{50}$ value of these $SiO_2$ particles is from 3 to 9 µm,
the SV value of the film is at least 700,
The scattering factor SF of the film is at least 2 and not more than 8
The haze of the film is from 60 to 95% and
its clarity is from 15 to 40%
All of the external layers comprise at least 0.3% by weight (based on the weight of the layer) of an organic UV stabilizer The total thickness of the film is at least 13 µm and at most 25 µm. The film thickness is preferably at least 14 and not more than 23 µm and ideally is at least 14.5 µm and not more than 21 µm. If the film thickness is less than 13 µm, the risk of film damage with cracking in the end application in the greenhouse becomes too great, and the mechanical strength of the film is no longer sufficient to accommodate the tensions which occur in the blind in application, without suffering from stretching. Above 40 µm, the film becomes too stiff, and in the opened, raised state, the resulting "film bale" is too large and its shading, accordingly, is excessive.

Single-layer films consist of just a single layer, also called base layer. In the case of a multilayer version, the film consists of the (i.e. one) base layer and at least one further layer, referred to, according to its positioning in the film, as an interlayer (in which case at least one further layer is located on each of the two surfaces) or outer layer (the layer forms an external layer of the film). In the case of the multilayer version, the thickness of the base layer is at least as great as the sum of the other layer thicknesses. The thickness of the base layer is preferably at least 55% of the total film thickness and ideally at least 63% of the total film thickness. The thickness of the remaining layers, preferably of the outer layers, is at least 0.5 µm, preferably at least 0.6 µm and ideally at least 0.7 µm. The thickness of the outer layers is not more than 4 µm and preferably not more than 3 µm and ideally not more than 1.5 µm. Below 0.5 µm, the operational stability and the thickness uniformity of the outer layer go down. From 0.7 µm onwards, very good operational stability is achieved. If the outer layers become too thick, there is a reduction in profitability, since securement of properties (especially of the UV stability) means that regrind ought to be supplied only to the base and, if the thickness of the base layer is too low in comparison to the total thickness, it is then necessary to supply excessive regrind to this layer, in percentage terms, in order to complete the cycle of regrind material. In that event, this may also have an adverse effect, by the base layer, on the properties such as UV stability and transparency for example. Moreover, the surface effect of the silicon dioxide particles falls from 2 μm onwards (and very greatly in particular from a layer thickness of 3 μm onwards), excessively, and a relatively large quantity of particles is needed in order to achieve the desired scattering effect.

The film is required, moreover, to exhibit low transmittance in the wavelength range below 370 nm to 300 nm. The transmittance at any wavelength within the stated range is less than 40%, preferably less than 30% and ideally less than 15% (for method see Measurement methods). As a result, the film is protected from embrittlement and yellowing; by this means, moreover, the plants and installations in the greenhouse are protected from UV light. Above 390 nm, the transparency is greater than 15%, preferably greater than 20% and ideally greater than 30%, since this wavelength range already has significant photosynthetic activity and plant growth would be adversely affected in the event of excessive filtering within this wavelength range. The low UV permeability is achieved through the addition of organic UV stabilizer. Low permeability to UV light protects the film and the flame stabilizer optionally present therein from rapid destruction and severe yellowing. The organic UV stabilizer here is selected from the group of triazines, benzotriazoles or benzoxazinones. Particularly preferred in this context are triazines, more particularly 2-(4,6-diphenyl-1,3,5-triazin-2-yl)-5-(hexyl)oxphenol (TINUVIN® 1577).

The film or, in the case of a multilayer film, at least one outer layer, preferably both outer layers, therefore comprise(s) at least one organic UV stabilizer. Preferred UV stabilizers in this context are triazine derivatives, especially 2-(4,6-diphenyl-1,3,5-triazin-2-yl)-5-(hexyl)oxyphenol (TINUVIN® 1577). Triazine derivatives are particularly preferred because their thermal stability is good at the customary PET processing temperatures of 275-310° C. and film outgassing is low.

The quantities in which UV stabilizers are added to the outer layer or layers and/or to the monofilm in one preferred embodiment are from 0.3 to 3% by weight, based on the weight of the layer. Particularly preferred is a UV stabilizer content of from 0.75 to 2.8% by weight. Ideally, the outer layers contain from 1.2 to 2.5% of UV stabilizer. In the multilayer embodiment of the film, the base layer as well, in addition to the outer layers, preferably comprises a UV stabilizer, in which the amount of UV stabilizer in % by weight in this base layer is preferably lower than in the outer layer(s). These stated amounts in the outer layer(s) are based on triazine derivatives. If, instead of a triazine derivative, wholly or partly a UV stabilizer from the group of benzotriazoles or benzoxazinones is used, then the fraction of triazine component replaced must be substituted by 1.5 times the amount of a benzotriazole or benzoxazinone component.

For the purposes of the invention, there is less than 0.3% by weight (based on the weight of the film) and ideally none (0% by weight) of whitening polymers which are nevertheless incompatible with the polyester that is the main constituent, such as polypropylene, cycloolefin copolymers (COCs), polyethylene, polystyrene etc., since, while such polymers do in some cases have a good light-scattering effect, they severely negatively impact the fire behaviour and, under the influence of UV, tend towards excessive yellowing, meaning that considerable additional quantities of UV stabilizer would be required, with the economics significantly impaired as a result.

The film, or in the case of a multilayer film, at least the base layer comprises, for the purpose of light scattering, silicon dioxide particles ("light-scattering particles") in an amount of at least 1.0% by weight, preferably at least 1.15% by weight and ideally at least 1.25% by weight, based on the total weight of the film. The amount of $SiO_2$ particles is at most 2.5% by weight, preferably at most 2.0% by weight and ideally at most 1.7% by weight. If the amount of the particles is too small, the light-scattering effect is too low. If the amount is too large, there is a drop in transparency, the unwanted transparency bow rises over the width of the film, and there is a deterioration in running reliability during film production. The aforementioned silicon dioxide particles have an average particle size $d_{50}$ of from 3 to 9 μm, preferably 4 to 8 μm and ideally a $d_{50}$ value of from 5-7 μm. These figures are based on the size of the particles used, as measured with a Malvern Master Sizer 2000.

In comparison to particles in the aforementioned size range, particles having a $d_{50}$ value of smaller than 3 μm result in a lower light-scattering angle and a greater reduction in transparency when the particle content (in % by weight) corresponds to that of the $SiO_2$ particles in the abovementioned size range. At the same level of particles (in % by weight), particles with a $d_{50}$ value of greater than 9 μm do not lead to any further improvement in the light-scattering effect, in comparison to particles in the desired size range. Moreover, large voids (cavities) are formed around the particles. The effect of these is to reduce transparency, and, moreover, they are not formed uniformly across the width of the film (they are oriented more greatly and more strongly in the machine direction in the edge region of the film web). This leads to a bow of transparency and scattering across the width of the film web, which is unwanted in the end application.

Base layer(s) and outer layer(s) may, moreover, comprise other particles for improving the light-scattering effect, or for improving windability. Examples of such inorganic or organic particles are calcium carbonate, apatite, other silicon dioxides (differing from, in particular smaller than, those described above), aluminium oxide, crosslinked polystyrene, crosslinked polymethyl methacrylate (PMMA), zeolites and other silicates such as aluminium silicates, or else white pigments such as $TiO_2$ or $BaSO_4$. These particles are added preferably to the outer layers in order to improve the windability of the film. If such particles are added, the use of silicon dioxide-based particles is pre erred, since they have little transparency-reducing effect and also contribute to the light-scattering effect. The fraction of these other or different particles is in no layer more than 1% by weight and is preferably below 0.5% by weight and ideally below 0.2% by weight in each layer, based in each case on the total weight of the respective layer.

In one preferred embodiment the film has three layers and at least 75% and more preferably at least 95% of the particles used for the purpose of light-scattering are present in the base layer. Ideally the outer layers each contain less than 1.5% of the light-scattering particles. This distribution of the light-scattering particles results in significant improvements in producibility, but more particularly in a significantly improved uniformity of thickness in comparison, for example, to a monofilm or to a film having a higher fraction of particles in the outer layer than the preferred fraction. At the stated distribution of the light-scattering particles, furthermore, there is a fall in the roughness of the film, resulting in a lower tendency for soiling (and hence loss of transparency) in the end application.

The attainment of a fire behaviour appropriate for greenhouse blinds does not necessitate flame retardants if the amounts of light-scattering particles and other particles, and also white pigments and incompatible polymers, are within the preferred ranges or, even better, within the particularly Preferred ranges (the film in that case achieves a rating in the fire test of 4 or lower). If amounts greater than the preferred amounts are used for one of the stated groups, or if an even further-reduced fire behaviour is needed for a particular greenhouse application, then it has proved to be favourable if the film further comprises a flame retardant based on organophosphorus compounds. Preferably these are esters of phosphoric acid or phosphonic acid. Here it has proven to be favourable for the phosphorus-containing compound to be part of the polyester. Phosphorus-containing flame retardants which are not copolymerized, such as Adeka-Stab 700 (4,4'-(isopropylidenediphenyl)bis(diphenyl phosphate)), for example, as well as the disadvantage of the outgassing of the flame retardant during production, also have a very great deleterious effect on the hydrolytic stability of the film, i.e. of the polyester, and so, in the hot and humid greenhouse conditions, embrittlement of the film is rapid and the blinds have to be replaced. These effects are reduced significantly through the use of phosphorus compounds incorporated into the polyester chain. Phosphorus in this case may be part of the main chain, as when using 2-carboxyethylmethylphosphinic acid, for example (other suitable compounds are described in DE-A-23 46 787, for example). Particularly preferred, however, are phosphorus compounds in which the phosphorus is in a side chain, since in this way the tendency towards hydrolysis under greenhouse conditions is the lowest. Such compounds are preferably compounds of the formula (I):

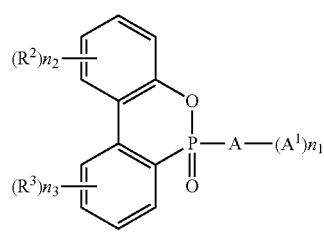

(I)

in which
R$^1$ is an ester-forming group selected from —COOR$^4$, —OR$^5$ and —OCOR$^6$,
R$^2$ and R$^3$ independently of one another are selected from halogen atoms, hydrocarbon groups having 1-10 C atoms, and R$^1$,
R$^4$ is hydrogen or a carbonyl group or a hydrocarbon group having 1-10 C atoms, which may contain an OH group or carboxyl group,
R$^5$ is hydrogen or a hydrocarbon group having 1-10 C atoms, which may contain an OH group or carboxyl group,
R$^6$ is a hydrocarbon group having 1-10 C atoms, which may contain an OH group or carboxyl group,
A is a divalent or trivalent hydrocarbon group having 1-8 C atoms,
n1 is 1 or 2, and
n2 and n3 are each 0, 1, 2, 3 or 4,
more particularly in which this compound of the formula (I) has two ester-forming functional groups.

Particularly suitable is 6-oxodibenzo[c,e] [1,2]oxaphosphorin-6-ylmethylsuccinic acid bis(2-hydroxyethyl) ester (CAS No. 63562-34-5). When this monomer is used in polyester production, the resulting polymers have a relatively low tendency towards hydrolysis, and can also be processed with good running reliability in film production.

The amount of flame retardants in one preferred embodiment is set such that the fraction of phosphorus in the film is at least 500 ppm, preferably at least 1200 ppm and ideally at least 1600 ppm. The fraction of phosphorus here is below 5000 ppm, preferably below 4000 ppm and ideally below 3000 ppm based on the respective weights of all components used (not on the amount of substance in moles). If the phosphorus fraction is below 500 ppm, the film burns up too quickly. The greater the fraction of phosphorus, the lower the burn-up rate, but the lower the hydrolytic stability as well. Above 5000 ppm, the film can be used for not more than one calendar year. Below 3000 rpm, the rate of hydrolysis is low enough to make decomposition by hydrolysis unlikely within a number of years of service.

The phosphorus content may be distributed evenly over the layers, or may be different. It has proved to be favourable, however, if the outer layers contain at least 75% of the phosphorus concentration of the inner layer or layers; preferably they contain the same phosphorus concentration, and ideally the outer layers contain at least 5% more phosphorus than the base layer. This leads to particularly favourable fire behaviour and the amount of phosphorus needed overall is lower.

At least 80% by weight of the polymer of the base layer B and of the other layers of the film (without taking account of UV stabilizers, particles, flame retardants, polyolefins and other additives) preferably consists of a thermoplastic polyester. Suitable polyesters for this purpose include those formed from ethylene glycol and terephthalic acid. (i.e. polyethylene terephthalate, PET), from ethylene glycol and naphthalene-2,6-dicarboxylic acid (i.e. polyethylene 2,6-naphthalate, PEN), and also from any desired mixtures of the stated carboxylic acids and diols. In particularly preferred polyesters, at least 85 mol %, preferably at least 90 mol % and ideally at least 92 mol % consist of ethylene glycol units and terephthalic acid units. The use of naphthalene-2,6-dicarboxylic acid has no advantages over the use of terephthalic acid, and so, in view of the higher price of naphthalene-2,6-dicarboxylic acid, it is usually not employed. The remaining monomer units come from other aliphatic, cycloaliphatic or aromatic diols and dicarboxylic acids, respectively.

Examples of other suitable aliphatic diols are diethylene glycol, triethylene glycol, aliphatic glycols of the general formula HO—(CH$_2$)$_n$—OH, where n is preferably less than 10, cyclohexanedimethanol, butanediol, propanediol, etc. Examples of other suitable dicarboxylic acids are isophthalic acid, adipic acid, etc. For the running reliability and the weathering stability in greenhouse applications it has emerged as being favourable if the film contains less than 2% by weight, preferably less than 1.5% by weight, of diethylene glycol. For the same reasons it has emerged as being favourable if the film contains less than 12 mol %, preferably less than 8 and ideally less than 5 mol %, of isophthalic acid (IPA) with respect to the dicarboxylic acid component of the polyester. In the preferred multilayer embodiment, however, at least one of the outer layers contains more than 8 mol % of the IPA and ideally more than 10 mol % of IPA, but less than 23 mol % of IPA, preferably less than 19 mol % and ideally less than 15 mol % with respect to the dicarboxylic acid component of the polyester (this modification serves to increase the transparency). In one preferred embodiment, furthermore, a layer having an IPA content of greater than 8 mol % contains at least 1.5% by weight, preferably more than 2.1% by weight, of organic UV stabilizer (as described above), in order to compensate the poorer UV stability of layers with increased IPA content. It has further emerged as being favourable if the film contains less than 3 mol %, ideally less than 1 mol %, of CHDM (1,4-cyclohexanedimethanol) with respect to the diol component of the polyester. It has further emerged as being favourable if the total amount (based on the total weight of the film) of isophthalic acid, diethylene glycol and CHDM is not greater than 7% by weight and is ideally less than 6% by weight. If the amount of the stated comonomers, especially that of CHDM, does not exceed the stated limits, the UV stability of the blinds produced from the film is significantly better than in the case of the versions in which the limits are exceeded.

For the production of the film of the invention, the SV value of the polyester is selected such that the SV value of the film is >600, preferably >650 and ideally >700. The SV value of the film here is <950 and preferably <850. Where the SV value is below 600, the film becomes so fragile even during production that tears are frequent. In the end applications, moreover, there is a more rapid further loss in viscosity with loss of flexibility of the films, with consequent fracture. Furthermore, the mechanical strengths stated later on below are no longer reliably achieved when the SV value is relatively low. If the film has an SV of greater than 950, then the polymer is so tough in the extruder, owing to the high particle loading, that excessive currents occur when the extruder's electrical motors are operated, and pressure fluctuations occur in the extrusion. This leads to poor running reliability. Furthermore, the abrasion on the extrusion tooling and on the cutting tools becomes disproportionately high.

Particularly important for the use of the films of the invention in greenhouse blinds is their transparency in combination with a suitable scattering behaviour. Here, generally speaking, particularly high transparency is desired, in order for the plants to be supplied with as much light as possible. In regions with very hot climates, however, a reduction in the amount of light is desirable, especially in the 2 hours around the highest position of the sun. For blinds which are employed in these climatic zones, the film of the invention preferably has a transparency of from 70 to 92%. For temperate climates (e.g. Europe, North America, Japan), the transparency of the film of the invention in a preferred embodiment is at least 80% and more particularly at least 83%.

For the suitable scattering behaviour of the film of the invention, there are essentially three parameters to be observed in addition to the transparency. First is the haze. It is from 60 to 95%, preferably from 65 to 90% and ideally from 70 to 86%. The second parameter is the clarity of the film. It is from 15 to 40%, preferably from 18 to 35% and ideally from 21 to 30%.

If the haze is too high (or the clarity too low), the light is too greatly scattered. In that case, owing to the backscattering, the high levels of transparency can no longer be achieved and in particular, owing to the high fraction of very highly scattered light, too much light is lost to the surroundings of the greenhouse, without having been able to impinge on the plants beforehand. In addition, the actual objective of using light-scattering films, namely the lighting of lower-lying parts of the plants, is achieved less effectively as a result, since the upper regions of adjacent plants then absorb the light and shade the lower regions of the neighbouring plants. If the haze is too low (or the clarity too high), then the light is not sufficiently scattered and the upper regions of the plants cast a shadow on lower-lying leaves. The upper leaves, accordingly, receive too much light, and excessive heating causes the photosynthesis activity to drop, whereas the lower leaves do not obtain sufficient light for maximum photosynthesis activity. Within the limits identified above, the average scattering angles of the invention are situated for optimum lighting of the plants.

These two standard variables of haze and clarity do not, however, provide an adequate description of the scattering, since they fail to take account of the transparency. Hence it is necessary also to comply with the scattering factor SF. This scattering factor SF is the ratio of transparency measured in accordance with ASTM-D 1003-61 (method A) to the transparency measured on the Clarityport (for details see Measurement methods):

SF=transparency as per ASTM-D 1003-61 (method A)/transparency as measured on the Clarityport The scattering factor SF is from 2 to 8, preferably from 2.5 to 7 and ideally from 3 to 4.5. Too low a scattering factor and too much un scattered light passes through the film at the prevailing transparency, with the above-described inadequate lighting of the parts of plants. Too high a scattering factor and, with the transparency formulated, excessive light is lost to the surroundings of the greenhouse (excessive light scattering), and neighbouring plants would lead to excessive shading.

The transparency of the invention and the scattering behaviour are achieved with the selection of the particles (especially the particle size) and the particle content (possibly also the distribution of the particles over the layers; see above), and also by the suitable polymers and, optionally, the production process below.

Particularly for achieving the high transparency levels in accordance with the invention it has proved to be favourable if the film is a multilayer film and at least one outer layer therein has an IPA content of 8 mol % IPA and ideally more than 10 mol % IPA, but less than 23 mol % IPA, preferably less than 19 mol % and ideally less than 15 mol % IPA, with respect to the dicarboxylic acid component of the polyester. Particularly preferred embodiments here are those with outer layers on either side having the stated IPA content. These outer layers have a thickness of <2 µm and preferably of <1.5 µm. Outer layers of this kind reduce the reflection-associated loss in transparency of the film. For the same reason it has emerged as being favourable if the film has on at least one side, and preferably both sides, a coating with a material whose refractive index is lower than that of the polyester films. Polyacrylates and silicones are particularly suitable. Suitable acrylates are described in EP-A-0 144 948, for example, and suitable silicones in EP-A-0 769 540, for example. The thickness of this or these coating(s) in each case is at least 30 nm, preferably at least 50 nm and more particularly at least 75 nm, and is not more than 150 nm, preferably not more than 130 nm and if not more than 110 nm. As a result, an ideal increase in transparency in the desired wavelength range is achieved. The coatings are applied preferably in line prior to transverse stretching by means of known methods (reverse gravure roll or else meyer bar) from preferably aqueous dispersion to the film. In one particularly preferred embodiment, the coating, based on the dry weight, comprises at least 1% by weight of a UV stabilizer, particular preference here being given to Tinuvin 479, or Tinuvin 5333-DW.

Production Process

The polyester polymers of the individual layers are prepared by polycondensation, either starting from dicarboxylic acids and diol or else starting from the esters of the dicarboxylic acids, preferably the dimethyl esters, and diol.

Polyesters which can be used preferably have SV values in the range from 500 to 1300, with the individual values being less important, but the average SV value of the raw materials used necessarily being greater than 700 and preferably being greater than 750.

The white pigments, $SiO_2$ particles, and UV stabilizers may be added during the production of the polyester itself. For this purpose the particles are dispersed in the diol, optionally ground, decanted and/or filtered, and added to the reactor in either the (trans)esterification step or polycondensation step. With preference it is possible to produce a concentrated, particle-containing or additive-containing polyester masterbatch using a twin-screw extruder, and to carry out dilution with particle-free polyester in the course of film extrusion. It has emerged here as being favourable if masterbatches containing less than 30% by weight of polyester are not used. In particular, the masterbatch containing $SiO_2$ particles ought not to have an $SiO_2$ content of more than 20% by weight (because of the risk of gelling). A further option is to add particles and additives directly during film extrusion in a twin-screw extruder.

If single-screw extruders are used, it has emerged as being advantageous to dry the polyesters beforehand. When using a twin-screw extruder with venting zone there is no need for the drying step.

First of all the polyester or polyester mixture of the layer or, in the case of multilayer films, of the individual layers is compressed in extruders and liquefied. The melt/melts is/are then shaped to flat melt films in a single-layer or multilayer die, pressed through a slot die and taken off on a chill roll and one or mote take-off rolls, where the film cools and hardens.

The film of the invention is biaxially oriented, i.e. biaxially stretched. The biaxial stretching of the film is most frequently carried out sequentially. In this case stretching takes place preferably first in longitudinal direction (i.e. in machine direction=MD) and subsequently in transverse direction (i.e. perpendicularly to the machine direction; = TD). Stretching in longitudinal direction may be carried out with the aid of two rolls running at different speeds in accordance with the desired stretching ratio. Transverse stretching is generally done using an appropriate center frame.

The temperature at which stretching is performed may vary within a relatively wide range and is guided by the desired properties of the film. Longitudinal stretching is carried out generally in a temperature range from 80 to 130° C. (heating temperatures 80 to 130° C.), and stretching in transverse direction in a temperature range from 90° C. (start of stretching) to 140° C. end of stretching). The longitudinal stretching ratio is in the range from 2.5:1 to 4.5:1, preferably from 2.8:1 to 3.4:1. A longitudinal stretching ratio above 3.4 tends to lower the light-scattering effect and ought therefore to be avoided. A stretching ratio above 4.5 results in significantly impaired ease of production (tears). The transverse stretching ratio is generally in the range from 2.5:1 to 5.0:1, preferably from 3.2:1 to 4.1. A transverse stretching ratio of greater than 4 tends to lower the light-scattering effect and transparency, and increases the unwanted transparency bow (fluctuation in transparency across the width of the film web, precise difference between web edge (about 50 cm distance from the hooks and web centre), which ought not to be greater than 2% (absolute), e.g. transparency in the web centre of 80% and 75% at the edges amounts to a deviation of 5% absolute and is therefore very poor) and ought therefore preferably to be avoided. In order to achieve the desired film properties it has proved to be advantageous if the stretching temperature (in MD and TD) is below 125° C. and preferably below 118° C. Prior to the transverse stretching, one or both surfaces of the film may be coated in-line in accordance with the methods known per se. The in-line coating may be utilized preferably in order to apply a coating for increased transparency (anti-reflection). In the course of the subsequent heat-setting, the film is maintained under tension at a temperature of 150 to 250° C. over a period of about 0.1 to 10 seconds, and is relaxed by at least 1%, preferably at least 3% and more preferably at least 4%, in transverse direction in order to achieve the preferred shrinkage values and lengthening values. This relaxation takes place preferably in a temperature range from 150 to 190° C. To reduce the transparency bow, the temperature in the first setting zone is preferably below 220° C. and more preferably below 190° C. For the same reason, moreover, at least 1%, preferably at least 2%, of the overall transverse stretching ratio ought preferably to be situated in the first setting zone, where stretching usually no longer takes place. The film is subsequently wound up in a customary way.

Other Film Properties

The film of the invention according to the method described above preferably has a contraction at 150° C. in longitudinal and transverse directions of below 3%, preferably below 2% and more preferably of below 1.5%. This film also at 100° C. has elongation of less than 3%, preferably of less than 1% and more preferably of less than 0.3%. This dimensional stability can be obtained, for example, through suitable relaxation of the film prior to winding (see method description). This dimensional stability is important to avoid a later contraction of the strips when used in blinds, a phenomenon which would lead to light showing through between the strips. In the production both of roll-down curtains and blinds, high contraction and excessive elongation both lead to the completed products stretching in wave-like forms.

The film of the invention also has a modulus of elasticity in both film directions of greater than 3000 $N/mm^2$ and preferably of greater than 3500 $N/mm^2$ and more preferably (in at least one film direction) of >4500 $N/mm^2$ in longitudinal and transverse directions. The F5 values (force at 5% elongation) in longitudinal and transverse directions are preferably more than 80 $N/mm^2$ and more preferably more than 90 $N/mm^2$. These mechanical properties can be set and obtained by varying the parameters of the biaxial stretching of the film within the method conditions specified above.

Films having the stated mechanical properties are not excessively stretched under tension in application, and remain readily guidable.

Application

The films of the invention are outstandingly suitable as light-scattering film, especially for producing blinds in greenhouses. In this case the film is typically cut into narrow strips, from which subsequently, together with polyester yarn (which must likewise be UV-stabilised), a woven/laid fabric is produced which is hung up in the greenhouse. The strips of the film of the invention may be combined here with strips of other films.

Alternatively the film itself (full area, no fabric) may also be installed in the greenhouse.

Such installations result in a reduction in the amount of light reaching the plant and hence to cooling during the day, and at the same time, by virtue of the high light scattering, provide uniform distribution of the remaining amount of light within the space, thus providing effective lighting of all plants/parts of the plants. During the night, these installations lead to reduced loss of heat by the greenhouse to the outside.

Analysis

The raw materials and the films were characterized using the following measurement values.

Measurement of Median Particle Diameter $d_{50}$

The average particle size $d_{50}$ was determined with a Malvern MASTER SIZER® 2000. The particles to be used were dispersed in water and transferred to a cell which was analysed in the instrument, the size determination taking place by means of laser diffraction. In general, the detector here records an intensity image of the diffracted laser light, and the particle size distribution is calculated from the angle-dependent light intensity of this intensity image, with the aid of a mathematical correlation function. The particle size distribution is characterized by two parameters, the median $d_{50}$ (=measure of position of the central value) and the degree of scattering SPAN98 (=measure of the scattering of the particle diameter). The measuring operation was automatic and also included the mathematical determination of the $d_{50}$ value.

Measurements on the film produced using these particles give a $d_{50}$ value which is lower by 15-25% than for the particles used.

UV/Vis Spectra and Transmittance at Wavelength x

The films were measured in transmission in a UV/Vis two-beam spectrometer (LAMBDA® 12 or 35) from Perkin Elmer USA. A film sample measuring approximately (3×5) cm is inserted via a flat-sample mount into the beam path, perpendicular to the measuring beam. The measuring beam passes by way of a 50 mm Ulbricht sphere to the detector, where intensity is determined in order to determine the transparency at desired wavelength. Air is used as background. The transmittance at the desired wavelength is read off.

Transparency

The transparency was measured according to ASTM-D 1003-61 (method A) using a HAZE-GARD® PLUS from BYX-Gardner GmbH Deutschland.

Clarity

The clarity is determined according to standard ASTM-D-1003 and by means of a HAZE-GARD® PLUS from BYK-Gardner GmbH. The light is deflected within a small solid angle, thereby concentrating the amount of scattered light in a narrow lobe. The distinctness of image is measured in an angular range of less than 2.5°. For the measurement of the distinctness of image (clarity), the film is mounted tightly to the clarity port.

Assessing Light Scattering (Measurement of Scattering Factor SF)

The light-scattering properties are of particular importance for the film of the invention. The assessment was made using a HAZE-GARD® PLUS transparency/haze meter from BYK Gardner (BYK-Gardner GmbH•Lausitzer Strasse 8.82538•Geretsried•Germany). For this purpose the transparency is measured of the film clamped into a clamping ring, by holding the film flush in front of the measurement port for the haze and transparency measurement as described in ASTM D-1003-61(method A). Subsequently the clamped film was held flush in front of the light emergence port (as for the clarity measurement) and the transparency was measured again. The light-scattering factor SF corresponds to the ratio of these two measurements:

SF=transparency (measured as per ASTM-D-1003-61 method A)/transparency measured in front of light emergence port SV (Standard Viscosity) Value The standard viscosity in dilute solution, SV, was measured in a method based on DIN 53728 Part 3, in an Ubbelohde viscometer at $(25\pm 0.05)°$ C. The solvent used was dichloroacetic acid (DCA). The concentration of the dissolved polymer was 1 g polymer/100 ml pure solvent. The polymer was dissolved at 60° C. for an hour. The samples were not fully dissolved after that time, up to two further attempts at dissolution were conducted at 80° C. for 40 minutes each, and the solutions were subsequently centrifuged for an hour at a rotational speed of 4100 min$^{-1}$. The dimensionless SV value is determined as follows from the relative viscosity $(\eta_{rel}=\eta/\eta_s)$:

$SV=(\eta_{rel}-1)\times 1000$

The fraction of particles in the film or polymer raw material was determined by ashing and corrected via appropriate increase of input weight, i.e.:

Input weight=(input weight corresponding to 100% polymer)/[(100−particle content in % by weight)/100)]

Mechanical Properties

The mechanical properties were determined by tensile testing in methods based on DIN EN ISO 572-1 and -3 (type 2 specimens) on film strips measuring 100 mm×15 mm.

Contraction

The thermal contraction was determined on square film specimens having an edge length of 10 cm. The samples were cut in such a way that one edge ran parallel to the machine direction and one edge perpendicular to the machine direction. The samples were measured precisely (the edge length $L_0$ was determined for each machine direction TD and MD, $L_{0\ TD}$ and $L_{0\ MD}$) and were conditioned in a forced air drying oven at the contraction temperature specified (presently 150° C.) for 15 minutes. The samples were removed and measured precisely at room temperature (edge length $L_{TD}$ and $L_{MD}$). The contraction is given by the following equation:

Contraction [%]MD=100·($L_{0\ MD}-L_{MD}$)/$L_{0\ MD}$, and

Contraction [%]TD=100·($L_{0\ TD}-L_{TD}$)/$L_{0\ TD}$

Elongation

The thermal elongation was determined on square film specimens having an edge length of 10 cm. The samples were measured precisely (edge length $L_0$), conditioned in a forced air drying oven at 100° C. for 15 minutes, and then measured precisely at room temperature (edge length L). The elongation is given by the following equation:

Elongation [%]=100*(L−$L_0$)/$L_0$ and was determined separately in each film direction.

UV Stability

The UV stability was determined as described in DE69731750 (DE of WO9806575) on page 8, whose United States equivalent is U.S. Pat. No. 6,270,888 hereby incorporated by reference herein, and the UTS value was reported in % of the initial value, with the weathering time being 2000 h rather than 1000 h.

Flame Retardancy

A section of film measuring 30*30 cm was secured by 2 clamps at their corners and suspended vertically. In general it should be ensured that there is no air movement at the site of suspension that causes visible movement of the section of film. A gentle draught from above here is acceptable. The section of film was subsequently exposed to a flame from below, in the centre of the lower side. The flame beam can be carried out using a standard commercial fire lighter or, more preferably, a Bunsen burner. The flame here must be longer than 1 cm and shorter than 3 cm. The flame was held to the film until the film continued to burn in the absence of the igniting flame (for at least 3 seconds). The flame was held to the film for no more than 5 seconds, however, and the film was moved to compensate for the film burning away/retracting. Four ignition procedures were carried out.

In the examples given here, the flame retardancy is evaluated using the following ratings:

1=in 4 ignition procedures, the film never burned for longer than 3 seconds.

2=the film ignited and extinguished itself after less than 15 seconds, leaving more than 30% of the film area.

3=the film ignited and extinguished itself after less than 20 seconds, leaving more than 30% of the film area.

4=the film ignited and extinguished itself after less than 40 seconds, leaving more than 30% of the film area.

5=the film ignited and extinguished itself after less than 40 seconds, leaving more than 10% of the film area.

6=the film burned for more than 40 seconds after ignition, or less than 10% of the film area remained after self-extinction.

EXAMPLES

Example 1-3 and CE1-7

The polymer mixtures were melted at 292° C. and applied electrostatically through a slot die to a chill roll heated at 50° C. The system is subsequently subjected to longitudinal and then transverse stretching under the following conditions:

| | | |
|---|---|---|
| Longitudinal stretching | Heating temperature | 75-115° C. |
| | Stretching temperature | 115° C. |
| | Longitudinal stretching ratio | 3.8 |
| Transverse stretching | Heating temperature | 100° C. |
| | Stretching temperature | 112° C. |
| | Transverse stretching ratio (including 1$^{st}$ setting zone stretching) | 3.9 |
| Setting | Temperature | 237-150° C. |
| | Duration | 3 s |
| | Relaxation in TD at 200-150° C. | 5% |
| Setting | Temperature of 1$^{st}$ setting zone | 170° C. |

In the examples (inventive) the raw materials employed are as follows:

PET1=Polyethylene terephthalate raw material made from ethylene glycol and terephthalic acid and having a SV of 820 and DEG content of 0.9% by weight (diethylene glycol content as monomer).

PET2=Polyethylene terephthalate raw material having an SV of 720 and 23% of bis[(5-ethyl-2-methyl-1,3,2-dioxaphosphorinan-5-yl)methyl] methylphosphonate P,P'-dioxide (Amgard P 1045). Corresponds to 18 000 ppm of phosphor from Amgard. The Amgard was incorporated into the polyethylene terephthalate on a twin-screw extruder.

PET3=Polyethylene terephthalate raw material having an SV of 730 and containing (6-oxodibenzo[c,e] [1,2]oxaphosphorin-6-ylmethyl)succinic acid bis(2-hydroxyethyl) ester as comonomer, the fraction of phosphorus from said comonomer being 18 000 ppm in the raw material.

PET4=Polyethylene terephthalate raw material having an SV of 700 and containing 20% by weight of TINUVIN® 1577. The UV stabilizer is comprised of 2-(4,6-diphenyl-1,3,5-triazin-2-yl)-5-(hexyl)oxyphenol (TINUVIN® 1577 from BASF, Ludwigshafen, Germany). TINUVIN® 1577 has a melting point of 149° C. and is thermally stable at 330° C.

PET5=Polyethylene terephthalate raw material having an SV of 700 and 15% by weight of silicon dioxide particles of SYLYSIA® 440 with a $d_{50}$ of 6.2 μm (manufacturer: Fuji Silysia Chemical Lt., Greenville N.C./USA). The $SiO_2$ was incorporated into the polyethylene terephthalate on a twin-screw extruder.

PET6=Polyethylene terephthalate raw material having an SV of 700 and 15% by weight of silicon dioxide particles of SYLYSIA® 310 P with a $d_{50}$ of 2.7 μm (manufacturer: Fuji Silysia Chemical Lt., Greenville N.C./USA). The $SiO_2$ was incorporated into the polyethylene terephthalate on a twin-screw extruder.

PET7=Polyethylene terephthalate raw material having an SV of 600 and 60% by weight of $TiO_2$ (type R-104 from DuPont, USA, in the rutile modification). The $TiO_2$ was incorporated into the polyethylene terephthalate on a twin-screw extruder.

PET8=Polyethylene terephthalate raw material having an SV of 710 and containing 25 mol % of isophthalic acid as comonomer.

As noted below, acrylate coating and application method were performed as in Example 1 from EP0144948, whose United States equivalent is U.S. Pat. No. 4,571,363, which is hereby incorporated by reference herein.

Table 1 which follows summarizes the formulas, production conditions and resultant film properties:

TABLE 1

| | | Example 1 | Example 2 | Example 3 | Example 4 | Example 5 | CE1 | CE2 | CE3 | CE4 |
|---|---|---|---|---|---|---|---|---|---|---|
| Layer | Film thickness | 15 | 19 | 15 | 19 | 15 | 19 | 15 | 15 | 15 |
| | Thickness A | 0.8 | 1 | 0.8 | 0.7 | 0.8 | 1 | 0.8 | 0.8 | 0.8 |
| | Thickness B | 13.4 | 17 | 13.4 | 16.8 | 13.4 | 17 | 13.4 | 13.4 | 13.4 |
| | Thickness C | 0.8 | 1 | 0.8 | 1.5 | 0.8 | 1 | 0.8 | 0.8 | 0.8 |
| | Coating | | | | | Dry thickness 80 nm. Acrylate and application method as in Example 1 from EP0144948 | | | | |
| A Layer | PET 1 | 89 | 89 | 74 | 89 | 89 | 89 | 74 | 89 | 89 |
| | PET 2 | | | | | | | 15 | | |
| | PET 3 | | | 15 | | | | 0 | | |
| | PET 4 | 10 | 10 | 10 | 10 | 10 | 10 | 10 | 10 | 10 |
| | PET 5 | | | | | | | | | |
| | PET 6 | 1 | 1 | 1 | 1 | 1 | 1 | 1 | 1 | 1 |
| | PET 7 | | | | | | | | | |
| | PET 8 | | | | | | | | | |
| | PET 9 | | | | | | | | | |

TABLE 1-continued

|  |  | Example 1 | Example 2 | Example 3 | Example 4 | Example 5 | CE1 | CE2 | CE3 | CE4 |
|---|---|---|---|---|---|---|---|---|---|---|
| B Layer | PET 1 | 81 | 81.5 | 66 | 81 | 81 | 69 | 66 | 86 | 85 |
|  | PET 2 |  |  |  |  |  |  | 15 |  |  |
|  | PET 3 |  |  | 15 |  |  |  | 0 |  |  |
|  | PET 4 | 9 | 9 | 9 | 9 | 9 | 9 | 9 | 9 | 9 |
|  | PET 5 | 10 | 9.5 | 10 | 10 | 10 | 22 | 10 | 2 | 0 |
|  | PET 6 |  |  |  |  |  |  |  |  | 6 |
|  | PET 7 |  |  |  |  |  |  |  | 3 |  |
|  | PET 8 |  |  |  |  |  |  |  |  |  |
|  | PET 9 |  |  |  |  |  |  |  |  |  |
| C Layer | PET 1 | 89 | 89 | 74 | 0 | 89 | 89 | 74 | 89 | 89 |
|  | PET 2 |  |  |  |  |  |  | 15 |  |  |
|  | PET 3 |  |  | 15 |  |  |  | 0 |  |  |
|  | PET 4 | 10 | 10 | 10 | 14 | 10 | 10 | 10 | 10 | 10 |
|  | PET 5 |  |  |  |  |  |  |  |  |  |
|  | PET 6 | 1 | 1 | 1 | 1 | 1 | 1 | 1 | 1 | 1 |
|  | PET 7 |  |  |  |  |  |  |  |  |  |
|  | PET 8 |  |  |  | 85 |  |  |  |  |  |
|  | PET 9 |  |  |  |  |  |  |  |  |  |
| Transparency (web centre) | in % | 85 | 83 | 84 | 86 | 87 | 69 | 82 | 63 | 92 |
| Transparency bow absolute |  | 1.8 | 1.5 | 1.7 | 1.7 | 1.8 | 3 | 1.8 | 3.7 | 0.5 |
| Clarity |  | 24 | 22 | 23 | 25 | 23 | 11 | 22 | 10 | 45 |
| Haze |  | 77 | 80 | 78 | 79 | 77 | 96 | 77 | 93 | 57 |
| Scattering factor SF |  | 3.4 | 3.6 | 3.3 | 3.5 | 3.5 | 12 | 3.4 | 9 | 1.6 |
| UV stability UTS | in % | 70 | 75 | 61 | 70 | 70 | 64 | 51 | 75 | 71 |
| Flame test | ratings | 4 | 3 | 2 | 3 | 4 | 5 | 2 | 5 | 4 |
| E-modulus MD | N/mm2 | 4100 | 4200 | 3900 | 3900 | 4100 | 3900 | 3800 | 4100 | 4100 |
| E-modulus TD | N/mm2 | 4700 | 4600 | 4100 | 4000 | 4600 | 4000 | 3900 | 4600 | 4700 |
| F5 MD | N/mm2 | 105 | 106 | 101 | 102 | 106 | 98 | 91 | 107 | 105 |
| F5 TD | N/mm2 | 114 | 110 | 100 | 101 | 113 | 102 | 95 | 111 | 115 |
| Contraction MD | in % | 1.4 | 1.3 | 1.5 | 1.2 | 1.6 | 1.5 | 1.2 | 1.4 | 1.3 |
| Contraction TD | in % | 0.2 | 0.3 | 0.3 | 0.3 | 0.3 | 0.2 | 0.1 | 0.2 | 0.1 |
| Elongation MD at 100° C. | in % | 0 | 0 | −0.1 | 0 | −0.1 | −0.1 | 0.1 | 0 | 0 |
| Elongation TD at 100° C. | in % | 0.1 | 0 | 0 | 0.1 | 0 | 0 | 0.1 | 0 | 0.1 |
| SV film |  | 735 | 741 | 708 | 733 | 737 | 699 | 620 | 737 | 740 |
| Transparency minimum between 390 and 400 nm |  | 41 | 39 | 41 | 43 | 45 | 18 | 4 | 14 | 61 |
| Transparency maximum between 300 and 370 nm |  | 13 | 12 | 14 | 14 | 14 | 6 | 12 | 5 | 21 |
| Notes |  |  |  |  |  |  | 33% more film tears than for Example 2 | Severe outgassing in extrusion region + numerous film tears |  |  |

That which is claimed:

1. A single- or multilayer polyester film with transparency from 70 to 92%, where the film is either a single-layer film or a multilayer film containing a mixture of light-scattering and windability particles, said film comprising a base layer and one or more external layers:

the single-layer film or base layer comprises first $SiO_2$ particles as light-scattering particles, present in an amount of at least 1.0% by weight and most 2.0% by weight, wherein the first $SiO_2$ particles have a ids $d_{50}$ particle size of from 5 to 9 μm, the film has a standard viscosity (SV) value of at least 700, the film has a scattering factor SF of at least 2 and not more than 8, the film has a haze of from 70 to 95%, and the film has a clarity of from 15 to 40%; and either the single-layer film or one or more external layer of the multilayer film comprise at least 0.3% by weight, based on the weight of the layer, of an organic UV stabilizer, the film has a total thickness of at least 13 μm and at most 25 μm, and the windability particles are smaller than the light-scattering particles.

2. The single- or multilayer polyester film according to claim 1, wherein said film has a transmittance in wavelength ranging below 370 nm to 300 nm of less than 40%.

3. The single- or multilayer polyester film according to claim 1, wherein the organic UV stabilizer is selected from triazines, benzotriazoles or benzoxazinones.

4. The single- or multilayer polyester film according to claim 3, wherein the organic UV stabilizer is 2-(4,6-diphenyl-1,3,5-triazin-2-yl)-5-(hexyl)oxyphenol.

5. The single- or multilayer polyester film according to claim 1, wherein the UV stabilizer(s) is added to either the single-layer film or one or more external layer at a quantity ranging from 0.3 to 3% by weight, based on the weight of the respective layer.

6. The single- or multilayer polyester film according to claim 1, wherein the film comprises less than 0.3% by weight, based on the weight of the film, of whitening polymers incompatible with the polyester that is the main constituent of the film.

7. The single- or multilayer polyester film according to claim 1, wherein no layer of the film comprises more than 1% by weight, based on the weight of the respective layer, of calcium carbonate particles, apatite particles, other silicon dioxide particles, aluminium oxide particles, crosslinked polystyrene particles, crosslinked polymethyl methacrylate (PMMA) particles, zeolite particles, aluminium silicate particles, $TiO_2$ particles or $BaSO_4$ particles.

8. The single- or multilayer polyester film according to claim 1, wherein said film comprises at least one outer layer(s) and the windability particles are silicon dioxide particles present in the outer layer(s) in an amount of less than 1% by weight to impart windability and the first, light-scattering $SiO_2$ particles are present in an amount of less than 2.0% by weight.

9. The single- or multilayer polyester film according to claim 1, wherein the film has three layers and is comprised of a base layer and two external layers, and at least 75% of the first $SiO_2$ particles are present in the base layer.

10. The single- or multilayer polyester film according to claim 9, wherein the external layers each comprise less than 1.5% of the first $SiO_2$ particles.

11. The single- or multilayer polyester film according to claim 1, wherein the film has a plurality of layers and has at least one external layer, and the polyester of said external layer comprises polyester having a dicarboxylic acid component comprising isophthalic acid, said isophthalic acid present in an amount ranging from 8 to 23% by mole with respect to the dicarboxylic acid component of the polyester.

12. The single- or multilayer polyester film according to claim 11, wherein the film has three layers and is comprised of a base layer and two external layers, where the isophthalic acid content of the polyester of both external layers is from 8 to 23% by mole, based on the dicarboxylic acid component of the respective layer.

13. The single- or multilayer polyester film according to claim 1, wherein the polyester does not comprise cyclohexanedimethanol.

14. The multilayer polyester film as claimed in claim 1, wherein the light-scattering $SiO_2$ particles have a $d_{50}$ value of 6.2 to 9 μm.

15. The single- or multilayer polyester film as claimed in claim 1, wherein said film has a maximum thickness of 23 μm.

16. The single- or multilayer polyester film as claimed in claim 1, wherein the (i) film is a multilayer film comprising a base layer and one or more external layer(s), (ii) the external layer(s) comprise particles consisting of windability particles, (iii) the base layer comprises particles consisting of light scattering particles and (iv) the base layer and external layer(s) comprise UV stabilizer.

17. A light-scattering film for the production of blinds comprising the single- or multilayer film according to claim 1.

18. Greenhouses comprising the single- or multilayer film according to claim 1.

19. Process for the production of the polyester single- or multilayer film according to claim 1, comprising
first compressing and liquefying the polyester or, respectively, the polyester mixture of the layer or of the individual layers is/are in one or more extruders,
shaping the resulting melt/melts is/are in a single- or multilayer die to give a flat melt film,
then drawing off the flat melt film on a chill roll and one or more take-off rolls to form a prefilm,
cooling and hardening the prefilm and biaxially orienting the prefilm.

20. A multilayer polyester film with transparency from 70 to 92%, where:
the film comprises a base layer and at least one external layer, said layers formed from polymer consisting of thermoplastic polyester;
the film comprises $SiO_2$ particles as light-scattering particles in the base layer, the $SiO_2$ particles present in an amount of at least 1.0% by weight and at most 1.7% by weight of $SiO_2$, wherein
the $SiO_2$ particles have a $d_{50}$ value of from 3 to 9 μm,
the film has a standard viscosity (SV) value of at least 700,
the film has a scattering factor SF of at least 2 and not more than 8,
the film has a haze of from 70 to 95%,
the film has a clarity of from 15 to 40%;
one or more of the external layer(s) comprise UV stabilizer, in an amount of at least 0.3% by weight, based on the weight of the layer, and other particles in an amount of less than 1% by weight,
the thermoplastic polyester comprises carboxylic acid consisting of terephthalic acid, isophthalic acid, naphthalene-2,6-dicarboxylic acid, adipic acid and mixtures thereof.

21. The multilayer polyester film as claimed in claim 20, wherein the film has a haze of from 77 to 95%, the other particles are in an amount of less than 0.2% by weight and light-scattering is imparted by the particles alone.

22. The multilayer polyester film as claimed in claim 20, wherein the external layer(s) range in thickness from 0.5 to 2 μm.

23. The multilayer polyester film as claimed in claim 20, wherein said layers are formed from (i) polymer consisting of polyester comprising carboxylic acid consisting of terephthalic acid, isophthalic acid, naphthalene-2,6-dicarboxylic acid, and mixtures thereof and (ii) optional other particles formed from crosslinked polystryrene particles or crosslinked polymethyl methacrylate particles.

24. The multilayer polyester film according to claim 20, wherein said film has a total thickness of at least 13 μm and at most 25 μm and the base layer is at least 55% of the total film thickness.

* * * * *